US009442294B2

(12) United States Patent
Urey (10) Patent No.: US 9,442,294 B2
(45) Date of Patent: Sep. 13, 2016

(54) IMAGE DISPLAY DEVICE IN THE FORM OF A PAIR OF EYE GLASSES COMPRISING MICRO REFLECTORS (71) Applicant: KOC UNIVERSITESI, Istanbul (TR)

(72) Inventor: Hakan Urey, Istanbul (TR)

(*) Notice: Subject to any disclaimer, the term of this patent is extended or adjusted under 35 U.S.C. 154(b) by 0 days.

(21) Appl. No.: 14/901,062

(22) PCT Filed: Mar. 19, 2014

(86) PCT No.: PCT/TR2014/000079
§ 371 (c)(1),
(2) Date: Dec. 27, 2015

(87) PCT Pub. No.: WO2014/209244
PCT Pub. Date: Dec. 31, 2014

(65) Prior Publication Data
US 2016/0209656 A1 Jul. 21, 2016

Related U.S. Application Data (60) Provisional application No. 61/839,983, filed on Jun. 27, 2013.

(51) Int. Cl.
G02B 27/01 (2006.01)
G02B 5/09 (2006.01)
G02F 1/1335 (2006.01)
G02B 27/00 (2006.01)
G02B 26/02 (2006.01)

(52) U.S. Cl.
CPC ............ G02B 27/0172 (2013.01); G02B 5/09 (2013.01); G02B 26/02 (2013.01); G02B 27/0093 (2013.01); G02F 1/133555 (2013.01); G02B 2027/0118 (2013.01); G02B 2027/0123 (2013.01); G02B 2027/0178 (2013.01)

(58) Field of Classification Search
CPC ..... G02B 5/09; G02B 26/02; G02B 27/0093
See application file for complete search history.

(56) References Cited

U.S. PATENT DOCUMENTS

| | | | | |
|---|---|---|---|---|
| 2005/0275714 A1* | 12/2005 | Ishikawa | ................ | A61B 3/145 348/14.02 |
| 2009/0066863 A1* | 3/2009 | Chen | .................... | G02F 1/13363 349/13 |
| 2010/0201953 A1 | 8/2010 | Freeman et al. | | |
| 2011/0157332 A1* | 6/2011 | Kim | .................... | H04N 13/0438 348/56 |
| 2012/0206665 A1* | 8/2012 | Sakai | ................. | G02B 27/2264 349/13 |

OTHER PUBLICATIONS

Jannick P. Rolland, Kevin P. Thompson, Hakan Urey, and Mason Thomas, Chapter: 10,4.1 "See-Through Head Worn Display (HWD) Architectures," Handbook of Visual Display Technology, 2011.
J. R. Fienup, "Phase retrieval algorithms: a comparison," Applied optics 21.15 , p. 2758-2769 (1982).
Buckley, Edward, et al. "Viewing angle enhancement for two-and three-dimensional holographic displays with random superresolution phase masks." Applied optics 45.28 (2006): 7334-7341.
(Continued)

Primary Examiner — Paul Lee
(74) Attorney, Agent, or Firm — Gokalp Bayramoglu (57) ABSTRACT The present invention relates to an image display device (1) comprises at least one spatial light modulator (2), at least one point light source (3), wherein the light source (3) is placed in front of the spatial light modulator (2). The display device is suitable for wearable Augmented Reality (AR) and 3D displays.

23 Claims, 5 Drawing Sheets (56) References Cited

OTHER PUBLICATIONS

K. Aksit, O. Eldes, S. Viswanathen, M. Freeman, H. Urey, "Portable 3D laser projector using mixed polarization technique," Journal of Displays, vol. 8 (10), pp. 582-589, 2012.

Kivanc Hedili M et al; "Microlens array-based high-gain screen design for direct projection head-up displays," Applied Optics, Optical Society of America, Washington, DC; US, vol. 52, No. 6, Feb. 20, 2013, pp. 1351-1357, XP001580477.

\* cited by examiner

IMAGE DISPLAY DEVICE IN THE FORM OF A PAIR OF EYE GLASSES COMPRISING MICRO REFLECTORS

TECHNICAL FIELD

The present invention relates to an image display device and more particularly, to a wearable image display device in the form of a pair of eye glasses.

BACKGROUND

Wearable displays are an enabling technology for Virtual Reality (VR), Augmented Reality (AR), and 3D mobile displays. There are many wearable technologies that deliver a virtual image to the eye but they all require relay lenses between the display panel and the eye.

In the design of wearable displays, it is desired to have a large field-of-view (FOV) and a large exit-pupil-size (12-15 mm) to allow for eye-motion without losing the image. In the state of the art embodiments, there are some examples of head-mounted displays in military HMD's and virtual reality goggles with large FOV (up to 80° or 120°), but the optics are very bulky. Alternative approaches to reduce the size and bulk of the optics have exploited different solutions: (i) Active pupil-tracking is a promising solution but the optical mechanisms offered to track the pupil are quite complicated; (ii) Unconventional optical relays to make the optics more compact using light guides relays, holographic relays, or substrate guided relays, which are promising but still require a compromise in FOV to achieve the thin form-factor; (iii) Displays that require wearing a special contact lens. In the U.S. Pat. No. 8,441,731 developed a look-around novel display using self-emissive transparent OLED. Viewing the display requires a special contact lens with a high-diopter center lens and polarized filters: and (iv) Displays placed directly on contact lens, which would have limited resolution due to limited space. Furthermore, light emitted from individual emitters are not coherent and cannot be used to write an image on the retina due to diffraction from each emitter unless emitters are coupled by lenses or emit diffraction-free highly directional rays.

Wearable displays require optics to relay the image from the image generator to the eye as the eye cannot focus on a display that is placed in front of the eye which is at only few centimeters distance. The required relay optics and lenses are large and cannot be miniaturized due to various optical design constraints. Despite great advancements in micro-technologies, true breakthroughs in especially 3D wearable displays for mobile devices and Augmented Reality (AR) are missing due to two fundamental problems: (i) the relay lenses from the image source to the eye must remain large to provide a large field-of-view and 3D perception and (ii) viewing comfort is limited due to missing depth cues.

SUMMARY OF THE INVENTION

The aim of the present invention is the realization of an image display device which has a large field of view, extendable to 3D perception and enabling viewing comfort without being limited due to missing depth cues.

The image display device realized in order to attain the aim of the present invention, explicated in the first claim and the respective claims thereof, comprises at least one spatial light modulator, at least one point light source, wherein the light source is placed in front of the spatial light modulator such that the light source directly illuminates the front surface of the spatial light modulator and a matrix of the micro reflectors that are attached on the back surface of the spatial light modulator. Micro reflectors am comprised of micro-mirrors.

The present invention overcomes some of the fundamental challenges of image display devices especially wearable display devices by:

(i) Eliminating the relay optics between the spatial light modulator and eye. The focusing problem of the eyes is overcome using the pinhole display principle, which provides infinite depth of focus. As a result, miniaturization of wearable displays will be possible by taking full advantage of the advancements in micro-technologies.

(ii) Providing all the essential 3D depth cues to avoid perceptual errors and viewing discomfort. Two eyes need to fixate at the correct depth of the objects rather than the display panel without losing resolution, thereby eliminating the conflict between accommodation and convergence.

BRIEF DESCRIPTION OF THE DRAWINGS

The image display device realized in order to attain the aim of the present invention is illustrated in the attached figures, where.

REFERENCE NUMERALS

1. Image display device
2. Spatial light modulator
3. Point light source
3A. Aperture
3B. Camera
4. Micro reflector
5. Filter
6. Frame
7. Nose bridge
8. Pupil tracker camera
9. Interface cables
10. Exit pupil replicator

DETAILED DESCRIPTION OF THE INVENTION

The image display device (1) of the present invention comprises at least one spatial light modulator (2), at least one point light source (3), wherein the point light source (3) and the viewer's eyes (A) are placed on the front side of the spatial light modulator (SLM) (2) such that the point light source (3) directly illuminate the front surface of the spatial light modulator (2) and characterized by a matrix of micro reflectors (4) that are attached on the back surface of the spatial light modulator (2).

Figure 1:
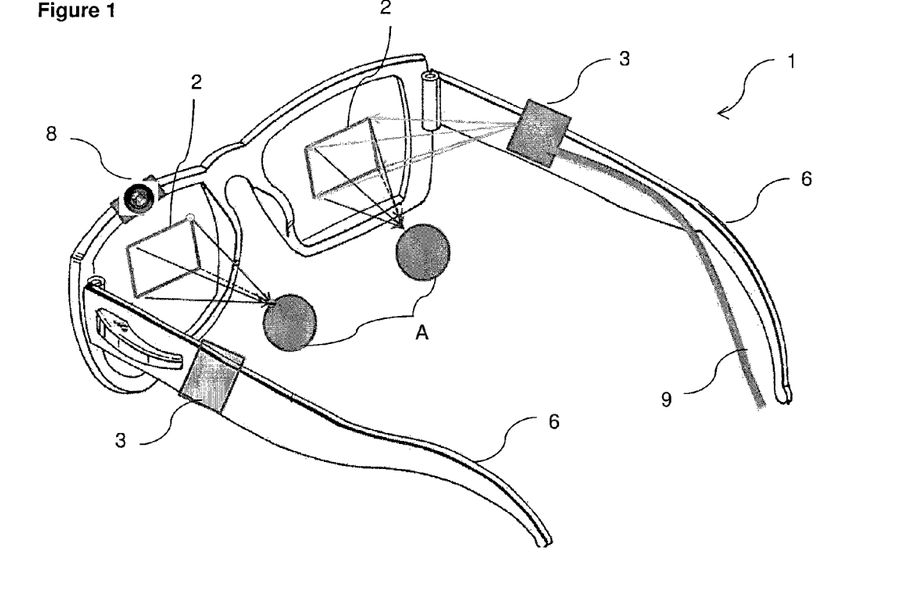
FIG. 1 is a the-preferred embodiment of the present invention.

Referring to FIG. 1, the basis of this invention is the pinhole camera imaging principle. The pinhole based imaging principle disclosed in this invention can produce a wide field-of-view imaging directly onto the retina without using external relay lenses between the SLM (2) and the eye (A). In this invention, diverging illumination created by the point light source (3) is converted to a converging illumination by matrix of micro reflectors (4) (FIG. 1).

While our eyes cannot focus on objects closer than 25 cm, using a pinhole in front of the eye, one can easily see objects that are only few cm away. The lensless image relay onto the retina from the image generator concept is based on using in the range 200 microns to 1 mm portion of the pupil much similar to the pinhole camera imaging principle but exploited for wearable displays.

Figure 2:
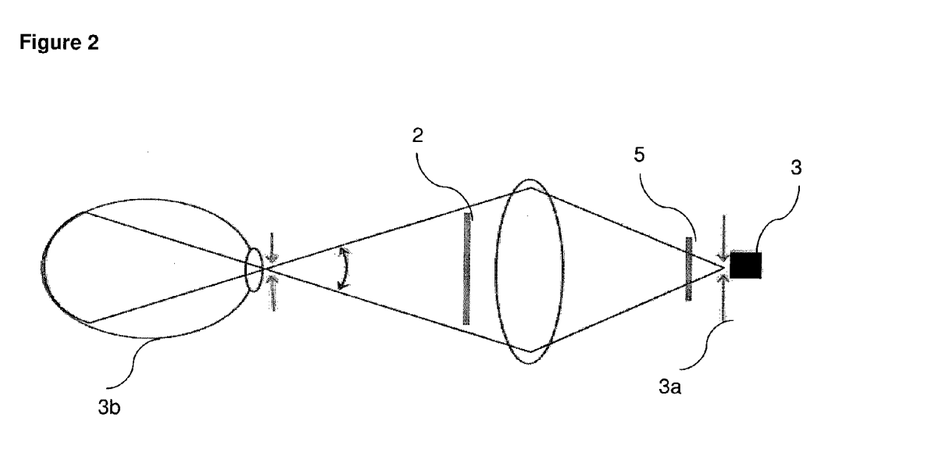
FIG. 2 is the experimental setup for pinhole imaging onto the retina using a transmissive display and a point source.
Figure 3:
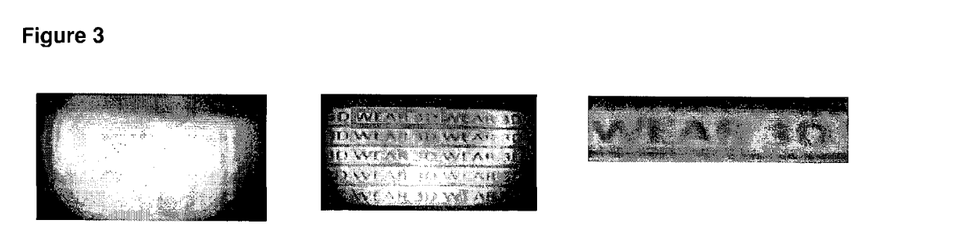
FIG. 3 is the preliminary experimental results using the setup in FIG. 2.

The camera imaging principle, without using a pinhole in front of the camera, is demonstrated using the experimental setup in FIG. 2, where the SLM (2) is at close proximity to the viewer's eye (A) and there are no optical components between the SLM (2) and the imaging camera (3B) that is focused at 25 cm distance to mimic a relaxed eye. The point light source (3) was an LED with large emission area, which was effectively reduced using an adjustable aperture (3A). The results are seen in FIG. 3. First image in the figure shows the camera (3B) image when the aperture (3A) was fully open; features on the SLM are not resolvable. The second image in the figure shows the improvement in resolution when the aperture (3A) was partly closed to achieve the pinhole camera effect. The third image in FIG. 3 is a zoomed version of the second image. While the image is in-focus, the resolution is limited to about 100 μm due to the limiting focusing power of the eye lens and the diffraction artefacts.

The diffraction artefacts due to propagation from the SLM to the camera (or the retina when observed with an eye) limits the achievable resolution. By computing the transfer function of the system from the display to the retina, it is possible to display a computer generated complex wave function on the SLM such that the diffraction artefacts are eliminated and a high-resolution image is formed on the retina. The pattern on the SLM can be computed using a kernel, which approximates the inverse of the system transfer function that is complex valued and rapidly varying. A phase only kernel (by taking into account the limitations of the SLM technology) will be designed using algorithms similar to those used in computer-generated holograms (CGH) and phase retrieval systems. The kernel can also be implemented in multiple frames and the integration at the eye will remove the noise in individual reconstructions.

The algorithm development and optimization to pre-process images to be displayed involves computational research using diffraction simulations, image processing, and the use of iterative Fourier transform algorithms. The system can be simulated using the exact complex-valued deconvolution kernel obtained using the inverse of the system transfer function. The pattern to be displayed on the SLM can be optimized considering the constraints imposed by the dynamic range and phase/amplitude display abilities of SLMs, image calibration requirements for different users anatomy, active pupil tracking to activate different set of LEDs, and real-time implementation.

While our eyes cannot focus on objects closer than 25 cm, using a pinhole in front of the eye, one can easily see objects that are only few cm away. The lensless image relay onto the retina from the image generator concept is based on using <1 mm portion of the pupil much similar to the pinhole camera imaging principle. While the image is in-focus, the resolution is limited to about 100 μm due to diffraction artefacts. To improve the retinal image quality, complex functions can be used. Such complex phase and amplitude functions can be represented as one or a series of images on the SLM (2) at high frame rate such that a resultant integrated image is perceived by the viewer's eyes (A).

In a similar manner by means of the matrix of micro reflectors (4) in FIG. 1, the light from the source is directed in the direction of the viewer's pupil and the details of the images become resolvable. The light from the point light source (3) are reflected in the direction of the center of the pupil to form a small exit pupil display. The image remains focused at different depths, which assure the desired large field-of-view without the loss of focus and without the off-axis aberrations as only a small portion of the pupil is used.

In the preferred embodiment of the present invention, the spatial light modulator (2) is a liquid crystal display (LCD). The LCD is a phase only spatial light modulator (2).

In the preferred embodiment of the present invention, micro reflectors (4), which are semi-transparent, are used in the micro reflector (4) array, Micro reflectors (4) are embedded between two layers with the same refractive index, thus, transmitted ray directions are not affected by the micro reflectors (4). The matrix of micro-reflectors (4) can be a free-form continuous surface, can be made up of discrete 1D or 2D matrix of micro-reflectors (4), or a combination of different types of reflective surfaces.

In an embodiment of the present invention, the image display device (1) comprises filters (5). In an embodiment of the present invention, the filters reflect only the wavelengths corresponding to the emission band of the light sources (3). The amount of transparency of the micro reflector (4) can be controlled using the filters (5) such as thin metal layer based coatings, dielectric reflector layers, polarizers and color filters.

The size of each micro-reflector (4) is expected to be the same size or larger than the SLM (2) pixels but the spacing needs to be optimized in such a way to avoid any visible diffraction artefacts and Moiré patterns, one method is to make them non-periodic.

In the preferred embodiment of the present invention, the point light sources (3) are LEDs.

In an embodiment of the present invention, the point light source (3) is edge-emitting LEDs.

In other embodiment of the present invention, the point light source is narrowband sources such as lasers diodes or VCSELs.

In other embodiment of the present invention, the light source (3) and spatial light modulators (2) are coupled with a polarizer film. The polarizer film is patterned to have different polarization properties in different parts of the film.

In the preferred embodiment of the present invention, the image display device (1) in the form of a pair of eyeglasses.

In a version of the said embodiment of the present invention, referring to FIG. 1, the point light source (3) is located on the frame (6) of the eyeglasses.

Figure 4:
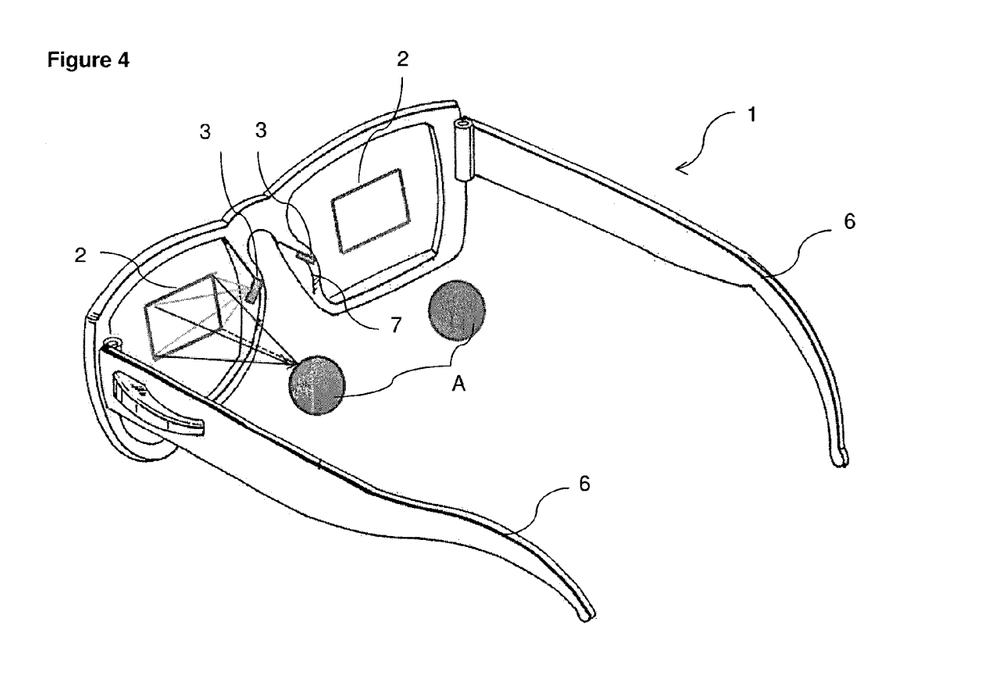
FIG. 4 is another embodiment of the present invention.

In another version of the said embodiment of the present invention, referring to FIG. 4, the point light source (3) is located on the nose bridge (7) of the eyeglasses. This embodiment allows for a screen surfaces with curvature that wraps around the viewer's face while allowing for large field-of-view display.

Figure 5:
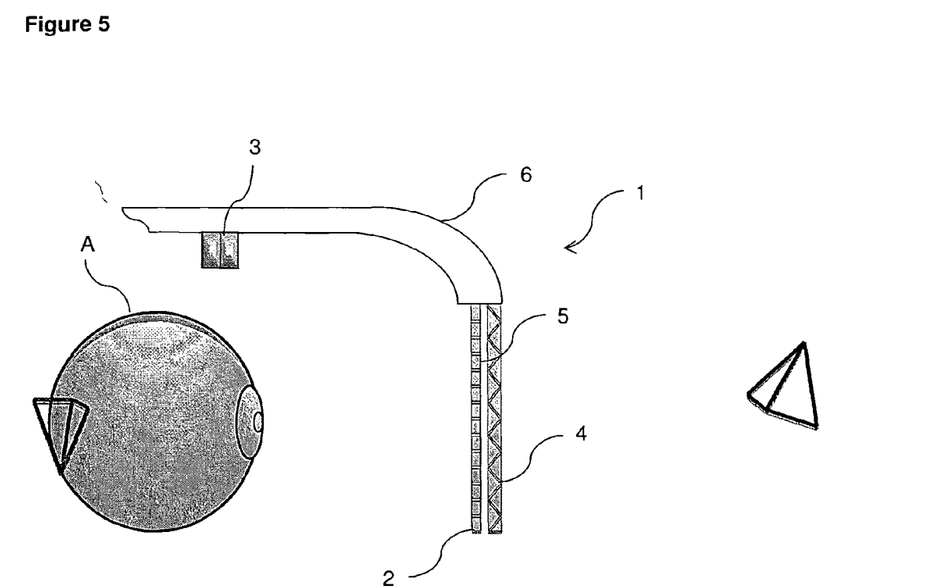
FIG. 5 is an image display device basic operation using SLM and micro reflector array on the screen.

In another embodiment of the present invention, referring to FIG. 5, image of the real world and the image formed by the point light source (3) and SLM (2) combination are superposed on the retina. Micro reflector (4) placed behind the SLM (2) gives the proper tilt to the incoming rays and directs them towards the viewer's eyes (A).

Figure 6:
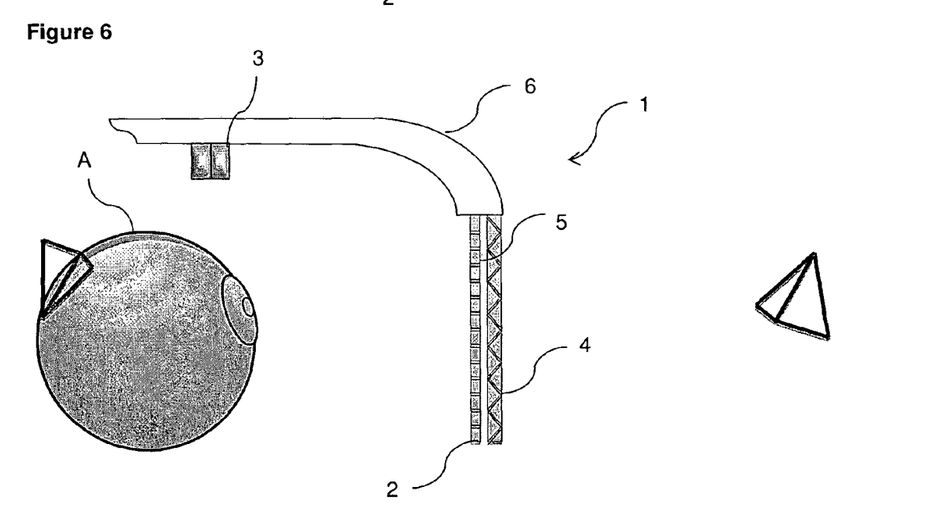
FIG. 6 is an image display device basic operation using SLM and micro reflector array on the screen for rotated eyeballs.

Referring to FIG. 6, the image formation when the eye is rotated to another position is achieved by activating another point light source (3), located at the optical conjugate of the center of the eye pupil.

Figure 7:
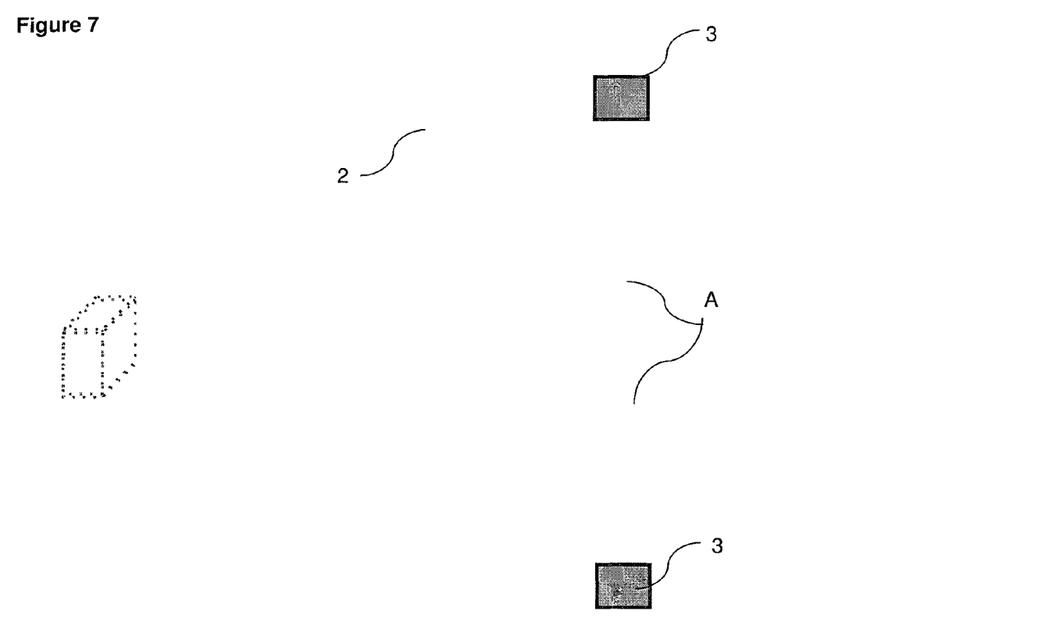
FIG. 7 is top view of a viewer with multiple illuminations at the center of the pupil using multiple light sources for each eye to achieve supermultiview.
Figure 8:
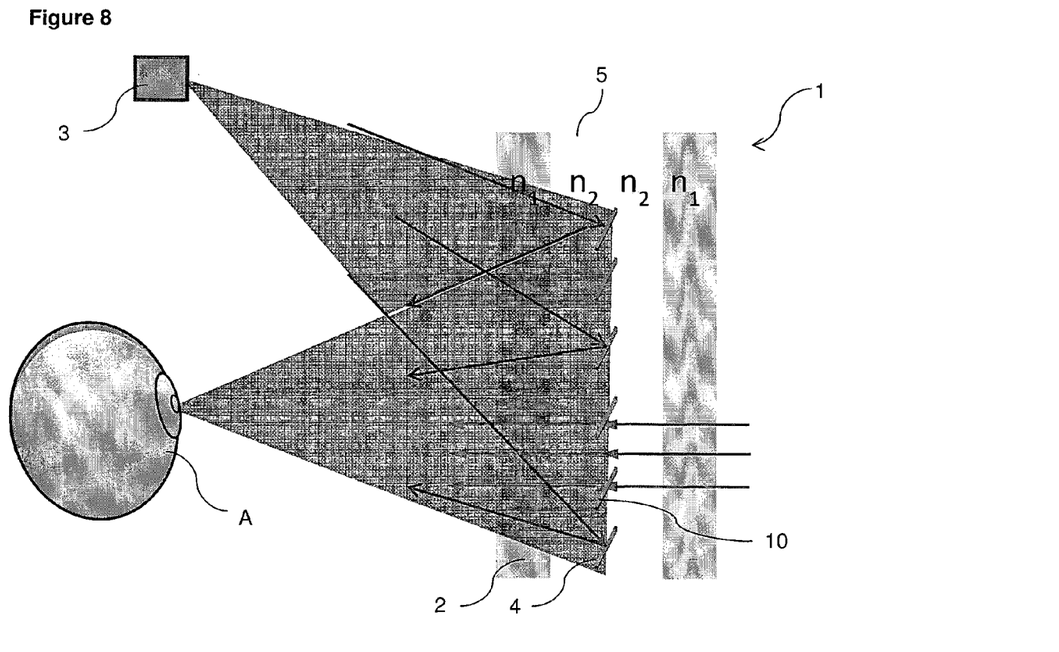
FIG. 8 is detail of screen with embedded micro reflectors, filters.

In a preferred embodiment of the preferred invention, referring to FIG. 7 and FIG. 8, matrix of micro reflectors (4) are semi-transparent or trans-reflective. The amount of transparency can be controlled using filters (5) such as thin metal layer based coatings, dielectric reflector layers, polarizers and color filters that reflect only the wavelengths corresponding to the emission band of the light sources. Transparency can be achieved by embedding the micro reflectors (4) in between two layers with the same refractive index, thus, transmitted ray directions are not effected by the micro reflectors (4). Additional AR notch coatings at specific light-source wavelengths can be applied to increase the efficiency of the filters.

Figure 9:
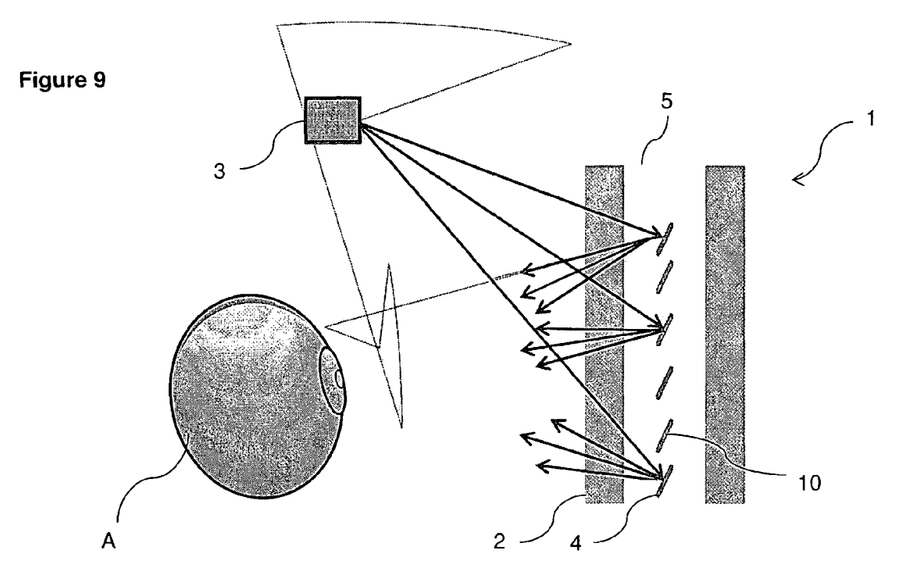
FIG. 9 is detail of screen with embedded micro reflectors, filters, and diffraction grating on each reflector.

In another embodiment of the present invention, referring to FIG. 9, an exit pupil replicator (10) coupled with the micro reflector (4). The exit pupil replicator (10) that can create multiple exit pupils can be selected from a grating such as a binary diffraction grating, array of mirrors with different tilts, or array of microlenses. In the case of a grating, the period of the grating pattern should be smaller than the micro reflectors (4) such that at least 3 periods of the grating patterns fit across each micro reflector (4). In a preferred embodiment, the period of the grating patterns should be small enough to ensure that the replicated exit pupils are separated by a distance larger than the eye pupil size. As a result, light can enter the pupil from only one of the replicated pupils. If a grating is used, then the separation between the replicated pupils is different for different wavelengths. If a non-periodic pattern such as a mirror array with slightly different tilts is used, the color dependent separation problem can be alleviated.

In another embodiment of the present invention, referring to FIG. 5, the image display device (1) comprises two sets of point light sources (3). Thus, a virtual point source is provided behind the eyeglasses for 3D vision The system uses two light sources (R1) and (L1) (3) coupled with eyeglasses to provide illumination to the right and left eyes (A). SLM (2) displays spatial information and micro reflectors (4) placed behind the SLM (2) direct the light beams toward the eyes (A) Micro reflectors (4) are preferably semi-transparent and allow electronic display information superposed with the natural vision. It is also possible to make the micro reflectors (4) completely occlude the natural vision. In this preferred configuration, micro reflectors (4) are passive and the angle of incidence and reflection from the micro reflector (4) is controlled by the tilt angle of the micro reflectors (4), which varies across the surface. SLM (2) can be used to control the brightness of each pixel using a polarized light source (3) and another polarizer between the SLM (2) and the micro reflector (4).

In another embodiment, referring to FIG. 5 and FIG. 6, micro reflectors (4) is actively controlled to track the viewer's pupil or to adjust the brightness of the electronic display and the natural scene. in a preferred version of this embodiment the light from the light sources (R1) and (L1) (3) are blocked at the exit of the display screen in transmission mode such that no light is emanating away from the eyeglasses for others to see. This is achieved using quarter wave plates and additional polarizers behind the micro reflectors (4). In another version of this embodiment, light can be blocked using active shutter filters, such as LCD shutters, mounted on the eyeglasses behind the micro reflectors (4). In another version of this embodiment, micro reflectors (4) are part of the active shutter filters such that they transmit when the shutter falter is open, reflect when shutter falter is closed. The SLM (2) and the light sources (3) also operate in synchronism with the active shutter filter, in other words, turned on when active shutter filter is closed and turned off when active shutter filter is open. This allows controlling the intensity of the transmitted light from natural scenes and the reflected light from the electronic display unit. The active shutter filter operation frequency should be faster than what the eye (A) can perceive such that the perceived image is flicker free. In another version of this embodiment, thin film coatings at the surface is used as notch filters to absorb the transmitted light in certain wavelength band emanating from the light sources (3).

In an embodiment of the invention, SLM (2) pixels are identical and no color filters are used. Primary red, green, and blue color images are obtained time-sequentially using R, G, B LEDs as light sources (3).

In another embodiment, white LEDs are used and color filters can be used in front of the pixels much similar to color LCDs.

In another embodiment of this invention, referring to FIG. 8, SLM (2) pixel intensity is controlled using a matrix of programmable micro reflectors (4). Tilting the micro reflectors (4) in the desired direction forms the desired exit pupils. Pixel intensities also is controlled by tilting the micro reflectors (4) to point in the desired exit pupil direction for fraction of the pixel duration and tilting it away from the eye pupil (A) in the rest of the pixel duration. Pixel intensity can also be controlled using pulse width modulation and digital modulation techniques used in reflective SLMs (2).

In another embodiment of this invention, referring to FIG. 7. the image display device (1) comprises four point light. sources (3), two at each side. In a preferred version of this embodiment, the following sequence of images is shown at 180 Hz rate corresponding to 60 Hz per frame: Frame 1: R1, G2, B1, Frame 2: R2, G1, B2, odd numbered frames: same as Frame 1, even numbered frames: same as Frame 2, R, G, B represent red, green, and blue channels and '1' and '2' represent the perspective Image L1 and perspective image L2. As a result, two perspective images can be shown simultaneously at 60 fps without doubling the overall frame rate. Thus, a preferred configuration to form two virtual point sources behind the eyeglasses for supermultiview 3D vision is achieved.

In an embodiment of this invention, the image display device (1) comprises pupil tracker camera (8) which detects the position of the eye pupil (A) and provide feedback. Based on the pupil position, the light sources (3) that are in optical conjugate position to the pupil are turned ON. Interface cables (9) provide the connection to the video electronics and the battery. The video information is relayed from a mobile computer on the head-mounted unit or using wireless communication means from remote computer. It is possible to integrate the concept to different types of head-worn displays and head and helmet mounted displays and head-mounted projectors. Additional sensors such as accelerometers, gyroscopes, pressure sensors, light level sensors, proximity sensors can be integrated to the system for added functionality that is in the known art. In one preferred embodiment, the content displayed can be changed based on the viewer position and angle. Based on the viewer's gaze and the ambient light levels, brightness, contrast, and the fraction of the field-of-view used by the display can be adjusted.

The invention claimed is:

1. An image display device in the form of a pair of eye glasses comprising:
   at least one spatial light modulator in the form of a planarly extending medium having a first side and a second opposite side and being mounted on a glass position of said eye glasses,
   at least one point light source, wherein the light source is placed at a first first side region relative to the spatial light modulator such that the light source directly illuminates a first side surface of the spatial light modulator, and
   wherein a matrix of micro reflectors that are attached on a second side surface of the spatial light modulator (SLM) and direct the light from the light source in the direction of at least one viewing region at a second first side region relative to said spatial light modulator, such that diverging illumination created by said point light source is converted to a converging illumination by said matrix of a micro-reflectors.

2. The image display device according to claim 1 wherein the spatial light modulator is a liquid crystal display (LCD).

3. The image display device according to claim 2 wherein the LCD is a phase only spatial light modulator.

4. The image display device according to claim 1 wherein the micro reflector is semi-transparent.

5. The image display device according to claim 1 wherein the micro reflector is coated with thin metal layer.

6. The image display device according to claim 1 wherein the micro reflectors are embedded between two layers with the same refractive index.

7. The image display device according to claim 1 wherein the light from the light source is reflected in the direction of the center of the pupil to form a small exit pupil display.

8. The image display device according to claim 1 comprising a plurality of filters that reflect only the wavelengths corresponding to the emission band of the light sources.

9. The image display device according to claim 1 wherein the spatial light modulator is coupled with a polarizer film.

10. The image display device according to claim 1 wherein the size of each micro reflector is the same size or larger than the SLM pixels and the spacing between the micro reflectors are non-periodic to avoid any visible diffraction artefacts and Moiré patterns.

11. The image display device according to claim 1 wherein the point light source is located on the frame of the eyeglasses.

12. The image display device according to claim 1 wherein in the point light source located on the nose bridge of the eyeglasses.

13. The image display device according to claim 1 wherein in the point light source is narrowband sources such as lasers diodes or VCSELs.

14. The image display device according to claim 1 wherein in the point light source is coupled with a polarizer.

15. The image display device according to claim 1 wherein a pair of image display devices provide illumination to the right and left eyes.

16. The image display device according to claim 1 wherein the micro reflectors that are actively controlled to track the pupil of the viewer's eye.

17. The image display device according to claim 1 wherein the micro reflectors are actively controlled to adjust the brightness of the electronic display and the natural scene.

18. The image display device according to claim 1 wherein the SLM pixel intensity is controlled using an array of programmable micro reflectors.

19. The image display device according to claim 1 further comprises at least four point light sources, at least two for each of the viewer's eye.

20. The image display device according to claim 1 wherein a set of red, green, and blue light sources are selected from LEDs or laser diodes.

21. The image display device according to claim 1 wherein a pupil tracker camera detects the position of the pupil of the viewer's eye.

22. The image display device according to claim 1 wherein the light sources are in optical conjugate position to the pupil of the viewer's eye which is turned ON.

23. The image display device according to claim 1 wherein an exit pupil replicator coupled with the micro reflectors.

* * * * *